(12) United States Patent
Stein et al.

(10) Patent No.: US 11,897,075 B2
(45) Date of Patent: Feb. 13, 2024

(54) KNIFE EDGE LOCATION SENSOR

(71) Applicant: GERBER TECHNOLOGY LLC, Tolland, CT (US)

(72) Inventors: Darryl C. Stein, Andover, CT (US); Timothy Philip MacDonald, South Windsor, CT (US)

(73) Assignee: GERBER TECHNOLOGY LLC, Tolland, CT (US)

( * ) Notice: Subject to any disclaimer, the term of this patent is extended or adjusted under 35 U.S.C. 154(b) by 269 days.

(21) Appl. No.: 17/125,703

(22) Filed: Dec. 17, 2020

(65) Prior Publication Data

US 2021/0187687 A1  Jun. 24, 2021

Related U.S. Application Data

(60) Provisional application No. 62/950,728, filed on Dec. 19, 2019.

(51) Int. Cl.
*B24B 3/54* (2006.01)
*B24B 41/06* (2012.01)
*B24D 15/08* (2006.01)

(52) U.S. Cl.
CPC ............... *B24B 3/54* (2013.01); *B24B 41/06* (2013.01); *B24D 15/08* (2013.01)

(58) Field of Classification Search
None
See application file for complete search history.

(56) References Cited

U.S. PATENT DOCUMENTS

| 4,033,214 | A | | 7/1977 | Pearl | |
|---|---|---|---|---|---|
| 4,133,235 | A | * | 1/1979 | Gerber | B26F 1/382 83/756 |
| 4,205,835 | A | | 6/1980 | Gerber | |
| 4,991,481 | A | * | 2/1991 | Gerber | B26D 7/12 30/350 |
| 5,152,105 | A | * | 10/1992 | Belvederi | B24B 3/46 76/85 |
| 5,573,442 | A | * | 11/1996 | Morita | G05B 19/404 83/62.1 |

(Continued)

OTHER PUBLICATIONS

Examination Report issued in corresponding European Patent Application No. 20842114.9, dated Mar. 11, 2022, 6 pages.

(Continued)

*Primary Examiner* — Brian D Keller
*Assistant Examiner* — Dana Lee Poon
(74) *Attorney, Agent, or Firm* — Day Pitney LLP; George Chaclas

(57) ABSTRACT

An apparatus for adjusting a knife edge offset in a cutter toolhead having a cutter toolhead frame. The apparatus including a knife moveably coupled to the toolhead, an actuated arm moveably attached to the cutter toolhead frame, a computer controller for controlling the movement of the knife and actuated arm, an abrasive sharpener moveably attached to the actuated arm and adapted to contact the knife, and a sensor adapted to determine a distance between the cutter toolhead frame and the actuated arm. The computer controller of the apparatus is further capable of adjusting the movement of the knife and the actuated arm as a function of the distance determined by the sensor.

4 Claims, 4 Drawing Sheets

(56) References Cited

U.S. PATENT DOCUMENTS

| | | | | |
|---|---|---|---|---|
| 8,915,766 | B1* | 12/2014 | Kolchin | ............... B24B 49/12 |
| | | | | 451/5 |
| 9,751,182 | B1* | 9/2017 | Warne | ................... B24B 3/36 |
| 2001/0049987 | A1* | 12/2001 | Vivirito | ................. B26D 7/12 |
| | | | | 83/174.1 |
| 2012/0156964 | A1* | 6/2012 | Anderson | ............... B24B 3/54 |
| | | | | 451/259 |
| 2015/0047486 | A1* | 2/2015 | Davies | ................. B26F 1/382 |
| | | | | 451/559 |
| 2015/0082957 | A1* | 3/2015 | Stein | ............... B23Q 17/0985 |
| | | | | 83/72 |
| 2019/0210177 | A1 | 7/2019 | Graves et al. | |

OTHER PUBLICATIONS

International Preliminary report on Patentability with Written Opinion issued in corresponding International Patent Application No. PCT/US2020/065710, dated May 17, 2022, 8 pages.

* cited by examiner

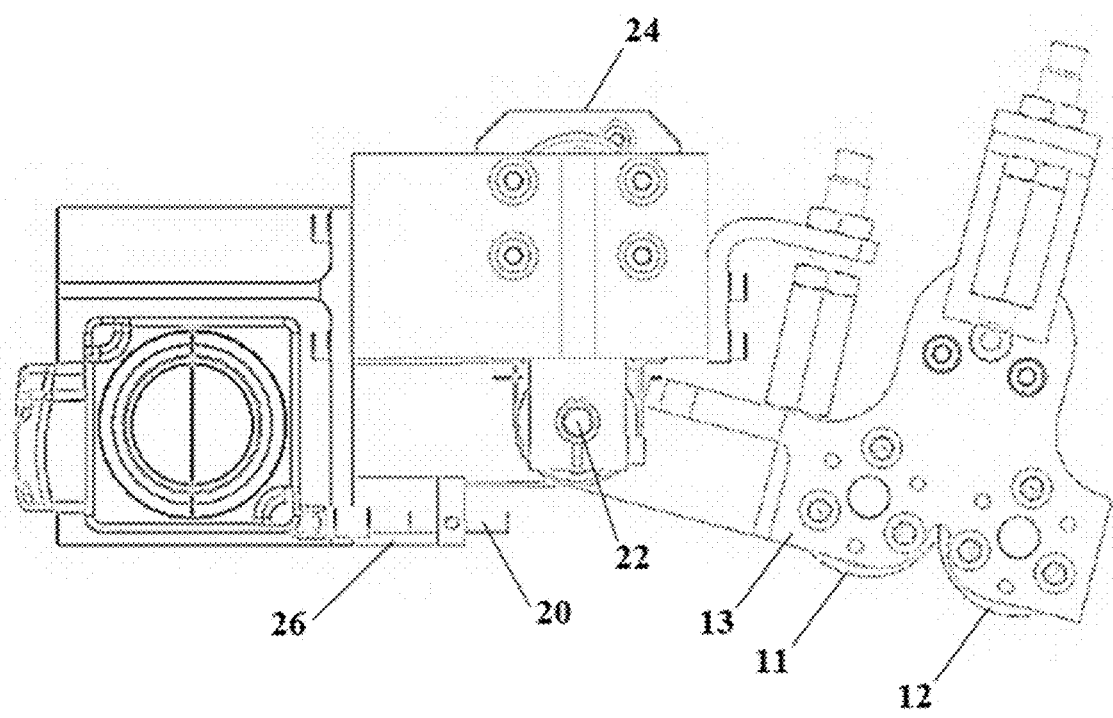
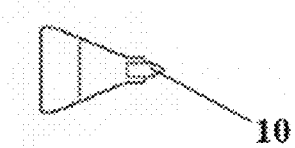
Figure 4

KNIFE EDGE LOCATION SENSOR

CROSS-REFERENCE TO RELATED APPLICATION

This application claims the benefit of priority to U.S. Provisional Application Ser. No. 62/950,728, filed Dec. 19, 2019, the disclosure of which is incorporated by reference herein in its entirety for any purpose whatsoever.

FIELD OF THE INVENTION

The present invention relates to computer numeric controlled (CNC) machines that use a knife as a cutting tool for cutting shapes of flexible material. More specifically, the present invention relates to computer numeric controlled (CNC) machines that use a knife as a cutting tool and include a sensor for determining a knife offset to reduce cutting error.

BACKGROUND OF THE INVENTION

Computer numeric controlled (CNC) machines may use a knife as a cutting tool for automated cutting of shapes typically of flexible materials such as fabric. A well-known usage of such a machine is automatic cutting of garment parts from stacked layers of fabric. Typically, the knife reciprocates in a direction parallel to the knife edge, and the knife is periodically sharpened by an automatic sharpener built into the machine. Successive sharpens wear back the knife edge causing the location of the edge to have an offset from the ideal or original edge location. It is not unusual for a knife edge to wear back 2.5 millimeters or more from its leading edge. Accurate CNC cutting must compensate for this offset of the knife edge. This is analogous to a well-known method called cutter diameter compensation where the programmed path input to a CNC machine is modified to account for cutter diameter differences from the nominal diameter. However, as discussed herein, the cutting tool is a knife instead of a cylindrical cutting tool, such as an end mill.

FIG. 1 illustrates an outline or toolpath of an example part suitable for CNC cutting using a knife. The outline includes notch 101, which is a common feature of garment parts, and is used by sewing machine operators as an alignment point between adjacent sewn parts. The adverse effect of an uncompensated knife edge offset is that cut features such as notches are displaced from their intended locations. For example, an actual cut notch 102 is shown displaced from the toolpath location of the notch 101. The cutting direction for the example of FIG. 1 is counter-clockwise, which is in the direction indicated by the arrow 100. The magnitude of displacement principally geometrically follows the knife edge offset.

The most common method of controlling adverse effects of knife edge offset is to replace the knife before the wear from sharpening exceeds some threshold amount. This method does not compensate for offset, instead it limits the amount of error. Other methods known to the prior art do compensate for the knife edge offset. These methods require either an estimate or a measurement of the knife edge location. One solution estimates the knife edge offset by tracking the number of sharpens and using the count to predict the amount of wear. The accuracy of this method is dependent on the precision and knowledge of the relationship between the number of sharpens to an amount of wear. This relationship is complex because the sharpener abrasive becomes less aggressive as it is used, and consequently the rate at which the abrasive wears back the knife diminishes with use of the abrasive. The method also requires resetting the sharpen counter when a new knife is installed, and this may be a manual operation subject to human error. The operator may forget or not know to reset a counter.

The prior art also includes methods for measuring the knife edge offset using a non-contact sensor. For example, US Patent Publication No. 2015/0082957, the disclosure of which is incorporated herein in its entirety, teaches a non-contact proximity sensor for measuring the knife edge offset. The location of the edge is found without contacting the knife. The use of the non-contact method in the prior art is motivated by the difficulty of measuring the location of a reciprocating edge by direct contact with a probe. The invention of this disclosure overcomes this difficulty by using the sharpener grinding wheels as the contact probe.

In the prior art, a knife sharpen cycle has fixed parameters including contact pressure and duration of contact between the abrasive and knife. As mentioned, the sharpener abrasive media becomes less aggressive with use. Consequently, the amount of knife edge wear is dependent on the state of aggressiveness of the abrasive media. When the abrasive media is new and aggressive, a sharpen cycle tends to wear too much material from the knife.

Accordingly, there is a need in the art for an apparatus that accurately determines a knife edge offset for a cutter toolhead. Further, there is a need in the art for an apparatus for preventing removal of too much material from the knife edge during sharpening by adjusting contact duration, abrasive wheel speed or pressure as needed to achieve uniform material removal from the knife for each sharpen.

SUMMARY OF THE INVENTION

Accordingly, one object of the invention is to provide a sensor that measures the size of a gap between an arm and a frame of a cutter toolhead. The sensor produces an electrical signal directly related to the size of the gap. The size of the gap is directly related to a knife edge offset for a knife of the cutter toolhead.

Another object of the invention provides that a first abrasive wheel and a second abrasive wheel act as a probe in contact with a knife of the cutter toolhead and mechanically govern the size of the gap between an arm and a frame of a cutter toolhead. Alternative sensors include capacitive proximity sensors, linear voltage displacement transducers, resistive potentiometers, encoders or any sensor that may produce a computer readable electrical signal related to the relative distance between two surfaces.

Another object of the invention provides that a knife edge offset may be determined by a computer-controller using data from a sensor that measures the size of a gap between an arm and a frame of a cutter toolhead. The sensor data is read by the computer-controller while a first abrasive wheel and a second abrasive wheel are in contact with a knife of the cutter toolhead. The sensor data may be read or sampled multiple times at a rate over the duration of a sharpen cycle to obtain a stored set of samples. The knife edge offset is obtained from the average sensor data by a linear function, table lookup calculation or other functional mapping commonly accomplished by a computer-controller.

DESCRIPTION OF THE DRAWINGS

The accompanying drawings, referred to herein and constituting a part hereof, illustrate a preferred embodiment of the invention and, together with the description, serve to explain the principles of the invention.

FIG. 4 shows a cutter toolhead with grinding wheels disengaged from the knife.

DETAILED DESCRIPTION OF THE INVENTION

The invention is generally applicable to a computer-controlled machine for cutting two dimensional shapes on a planar work surface. The machine includes a gantry that positions a cutter toolhead using two or more servo motors to follow controlled tool paths within the plane parallel to the work surface. A material to be cut is placed on the work surface. U.S. Pat. No. 4,205,835, the disclosure of which is incorporated herein in its entirety, describes a bristle bed work surface suitable for supporting a material while cutting with a reciprocating knife.

Figure 2:
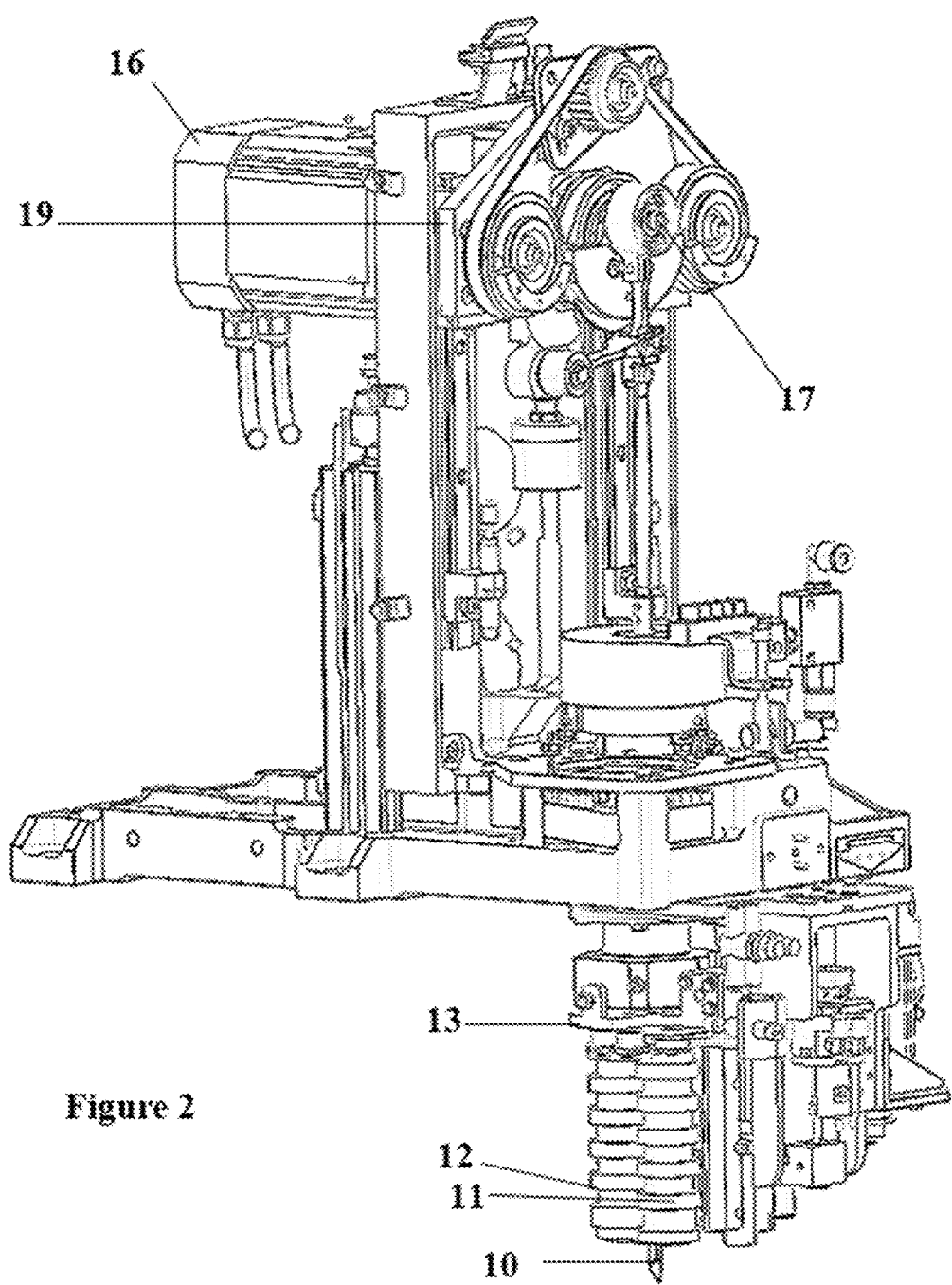
FIG. 2 shows a cutter toolhead with a sensor for measuring the location of the knife edge in accordance with the invention.

FIG. 2 illustrates a cutter toolhead that includes a knife 10 that is powered to reciprocate normal to the work surface by a knife motor 16 and a drive means that includes a crank arm 17. The knife motor 16 provides most of the work done to cut the material. The knife 10 and a knife drive means that includes a crank arm 17 may be positioned in the states of either tool-up or tool-down by an elevator platform 19 that is typically actuated by a pneumatic cylinder. In the tool-down state, the knife 10 pierces and cuts the material placed on the planar work surface. In the tool-up state, the knife 10 is located in a clearance plane above the material and in this state the knife may be moved to start points of cut lines. The tool-up state is also used to position the knife 10 for sharpening. FIG. 2 shows the knife in the tool-up state.

Figure 3:
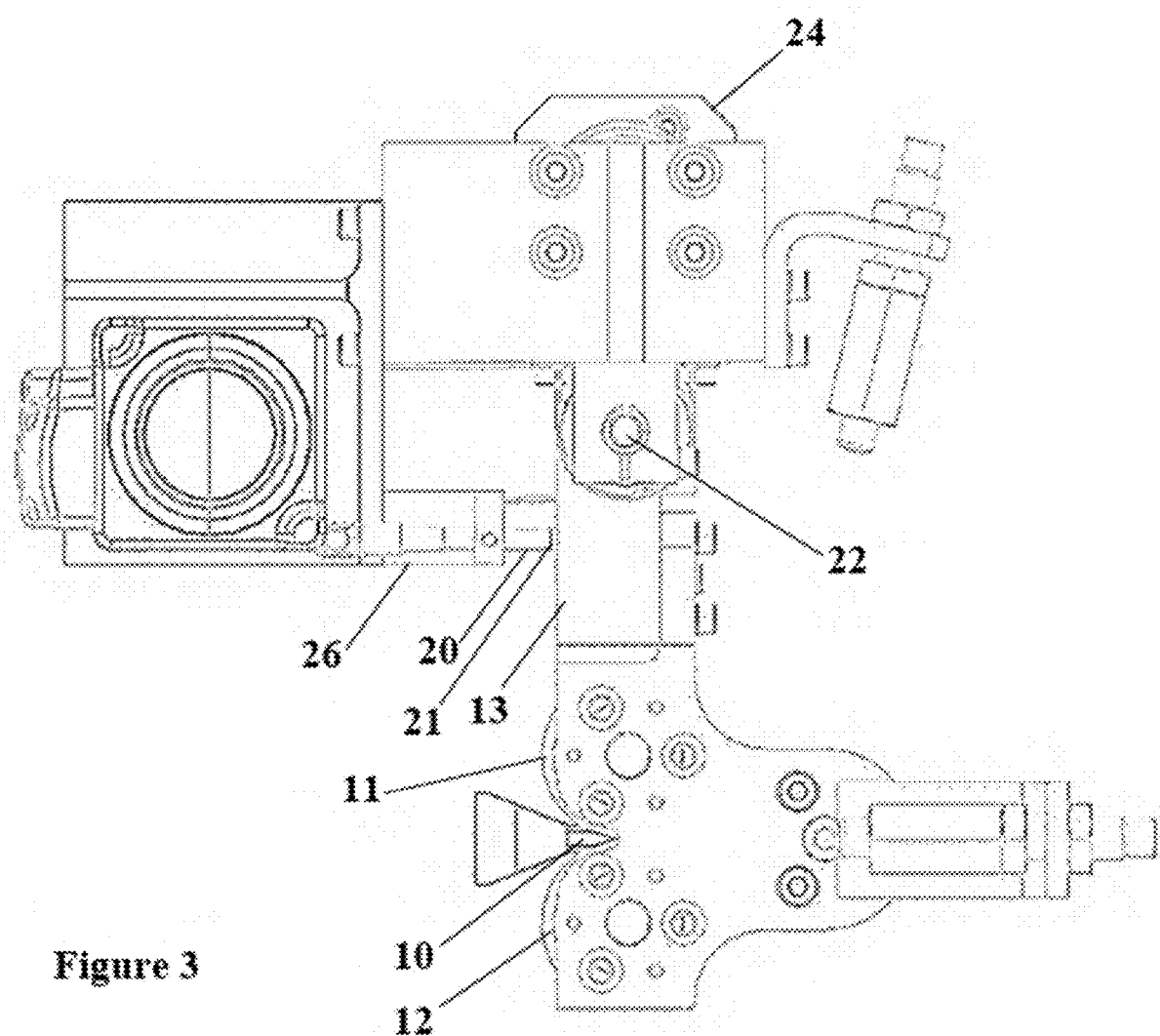
FIG. 3 shows a cutter toolhead with grinding wheels engaged with the knife.

As illustrated in FIG. 3, the knife 10 is periodically sharpened by a first abrasive wheel 11 and second abrasive wheel 12. The first abrasive wheel 11 and second abrasive wheel 12 are rotatably coupled to an arm 13, and are both driven by a grinder motor by means of a transmission comprised of gears or belts. In the preferred embodiment, the arm 13 rotates about pivot 22 relative to a frame 26, and the arm 13 is rotationally actuated by a rotary pneumatic cylinder 24 to either an engaged position or disengaged position. In the engaged position shown in FIG. 3, the first abrasive wheel 11 and second abrasive wheel 12 are in contact with the knife 10 to sharpen the knife 10.

In the disengaged position shown in FIG. 4, the first abrasive wheel 11 and second abrasive wheel 12 are stored away from the knife 10, and in this state cutting and other non-sharpen operations occur.

A preferred embodiment of this invention includes a sensor 20 attached to the frame 26 that measures the size of a gap 21 between the arm 13 and the frame 26. The sensor 20 produces an electrical signal readable by the computer-controlled machine directly related to the size of the gap 21. The size of the gap is directly related to the knife edge offset. That is, the first abrasive wheel 11 and second abrasive wheel 12 act as a probe in contact with the knife 10 and mechanically govern the size of the gap 21. Alternative sensors include capacitive proximity sensors, linear voltage displacement transducers, resistive potentiometers, encoders or any sensor that may produce a computer readable electrical signal related to the relative distance between two surfaces. Another embodiment of the invention measures the angle between the arm 13 and the frame 26. The angle may be measured by a rotary encoder or other equivalent sensor producing a computer readable electrical signal. Yet another embodiment of the invention has the arm 13 slidably coupled to the frame 26 instead of rotating about a pivot 22. For example, the arm 13 may be mounted to a linear bearing that would allow the first abrasive wheel 11 and second abrasive wheel 12 to slide along a line to create an engaged position where the knife 10 is sharpened and a disengaged position where the abrasive wheels are stored. Actuation of the sharpener could be achieved by a straight-line type pneumatic cylinder instead of a rotary pneumatic cylinder 24.

The knife edge offset is determined by the computer-controller using data from the sensor 20. The sensor 20 output is read by the computer-controller while the first abrasive wheel 11 and second abrasive wheel 12 are in contact with the knife 10. The sensor 20 output may be read or sampled multiple times at a rate over the duration of the sharpen cycle to obtain a stored set of samples. Each sample may be slightly different due to vibration and electrical noise. If the rate is 100 samples per second and the sharpen duration is 0.5 seconds, then the set of samples would include 50 stored values. The set of samples may be averaged by the computer-controller to obtain an average sensor output, and is an estimate less susceptible to the effects of vibration and electrical noise. The knife edge offset is obtained from the average sensor output by a linear function, table lookup calculation or other functional mapping commonly accomplished by a computer-controller.

In the preferred embodiment, the knife edge offset is calculated from the average sensor output using a linear function. Preferably, the knife edge offset is nominally zero for a new knife and increases as the knife 10 wears. The slope of the linear function may be such to obtain the knife edge offset in standard dimensional units such as millimeters. In the preferred embodiment the knife edge offset is further processed by the computer-controller. Each sharpen cycle will generate a new knife edge offset value. Because of vibration and electrical noise, in practice some variation will exist in the sequence of values. Those skilled in the art will recognize a smoother estimate may be obtained by calculating a weighted average of the current and some of the previous knife edge offset values. In the preferred embodiment, this estimate will substitute for the original knife edge offset.

Figure 1:
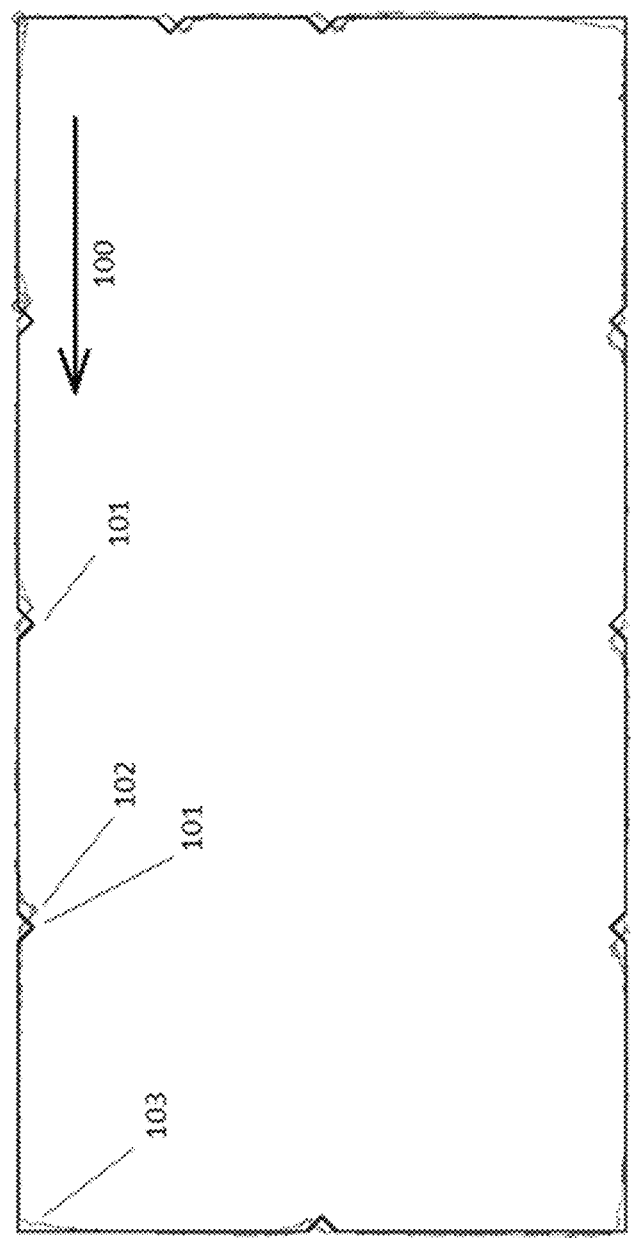
FIG. 1 illustrates an outline or toolpath of an example part suitable for CNC cutting using a knife.

Information of the knife edge offset may be used by the computer-controller to compensate for a worn knife edge. Without compensation, for example, the toolpath location of the notch 101 in FIG. 1 is displaced to the actual cut notch 102 location. The computer-controller executes a compensation algorithm that modifies the toolpath geometry such that the actual knife edge follows the toolpath. The solution to this problem is well-known to those skilled in the art of inverse kinematics.

Another use of the knife edge offset is for automatically determining when the knife 10 requires replacement. After each sharpen the computer-controller may compare the knife edge offset with a threshold value. The machine may warn the operator or stop the machine and require a knife 10 replacement should the knife edge offset exceed the threshold value.

Yet another use of the knife edge offset is for automatically determining when a new knife has been installed. The computer-controller may detect a new knife by looking for the knife edge offset to fall to a near zero value after previously sustaining a much larger value. Information of when a knife is new and when it needs to be replaced makes it possible for the computer-controller to count the number of sharpens that a particular knife receives over the course of its life and notify the operator of a pending necessary knife change or cease operation when the knife is worn to it's useful life.

Yet another use of the knife edge offset is to determine an aggressiveness estimate of the first and the second abrasive wheel, and use the aggressiveness estimate to adjust sharpener cycle parameters such as grind time to achieve consistent material removal from the knife in a single sharpen. The aggressiveness estimate may be calculated as the change in knife edge offset per grinding wheel revolution. Preferably, the aggressiveness estimate would be calculated as an average value of multiple sharpens, for example the most recent 100 sharpen cycles. It is desirable for the sharpener cycle parameters be maintained such that change of knife edge offset per sharpen nearly always equal a target value. For example, the target value may be 0.8 microns per sharpen. The aggressiveness estimate information would be used by the computer-controller in a feedback loop that adjusts sharpener cycle of grind time or abrasive wheel speed. A decreasing aggressiveness estimate may be compensated by increasing either or both the grind time or abrasive wheel speed. Either compensation increases the number of abrasive wheel revolutions per sharpen thereby increasing material removal per sharpen.

The aggressiveness estimate may be used by the computer-controller to detect when the first and second abrasive wheel need replacement. The aggressiveness estimate will slowly decrease as the abrasive wheels age. Eventually the aggressiveness estimate will fall to level too low where it is no longer practical to compensate for decreasing knife material removal by increasing grind time or abrasive wheel speed. The computer-controller may monitor the aggressiveness estimate, and when the estimate falls below a threshold value, the operator would be notified or forced to change the first abrasive wheel 11 and second abrasive wheel 12.

It may be appreciated that abrasive wear to first abrasive wheel 11 and second abrasive wheel 12 will contribute to the readings of sensor 20. Abrasive wear, however, is assumed to be small and negligible relative to knife wear. More specifically, abrasive wheel 11 and second abrasive wheel 12 are preferably cubic boron nitride (CBN). The grain sizes for cubic boron nitride abrasive wheels 151 microns (0.0059 inches). About 55% of these grains are encapsulated to mechanically hold them to the wheel. Consequently, the contribution of abrasive wear to the readings of sensor 20 is only 45% of the grain size or 68 microns (0.0027 inches). These values are negligible when compared to the 2500 micrometer (0.10 inches) possible knife wear.

The invention in its broader aspects is not limited to the specific embodiments herein shown and described and departures may be made therefrom within the scope of the accompanying claims without departing from the principles of the invention and without sacrificing its chief advantages.

What is claimed is:

1. An apparatus for cutting material with compensation for knife edge offset, the apparatus comprising:
    a base frame having a planar work surface;
    a gantry assembly mounted above the planar work surface and having a cutter toolhead frame mounted for movement;
    a knife moveably coupled to the cutter toolhead frame;
    an actuated arm moveably attached to the cutter toolhead frame;
    a computer controller that controls movements of the actuated arm and movements of the knife including a toolpath of the knife when cutting, material;
    an abrasive sharpener attached to the actuated arm and adapted to selectively contact the knife for sharpening the knife; and
    a sensor adapted to determine a distance between the cutter toolhead frame and the actuated arm during sharpening;
    wherein the computer controller determines the knife edge offset based on the distance and adjusts the movements of the knife including the toolpath of the knife during cutting based on the knife edge offset to improve cutting accuracy, and
    wherein the knife is a reciprocating knife and the abrasive sharpener includes two abrasive wheels and the two abrasive wheels include a first abrasive wheel and a second abrasive wheel configured to act as a probe in contact with the knife.

2. An apparatus according to claim 1, wherein the computer controller determines when the knife requires replacement based on comparing knife edge offset to a stored threshold value.

3. An apparatus according to claim 1, wherein the computer controller adjusts pressure of the abrasive sharpener to provide consistent material removal from the knife.

4. An apparatus according to claim 1 wherein, the computer controller determines when a new knife has been installed based upon comparing the knife edge offset to a stored value.

* * * * *